Feb. 24, 1953         H. D. STUCK        2,629,677
PROCESS OF MANUFACTURING COMPOUND CUTTING MACHINE KNIVES
Filed Oct. 11, 1949                         2 SHEETS—SHEET 1
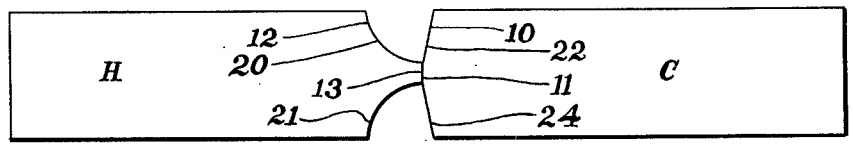
*Fig. 1.*
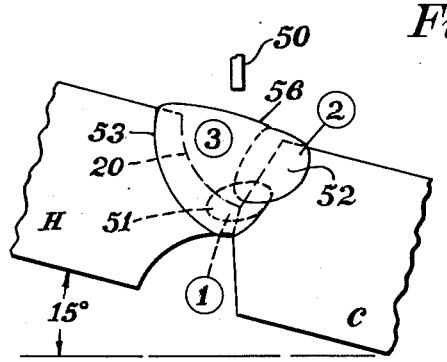
*Fig. 2.*
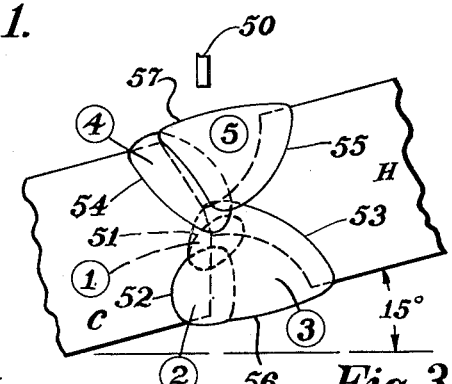
*Fig. 3.*
*Fig. 4.*
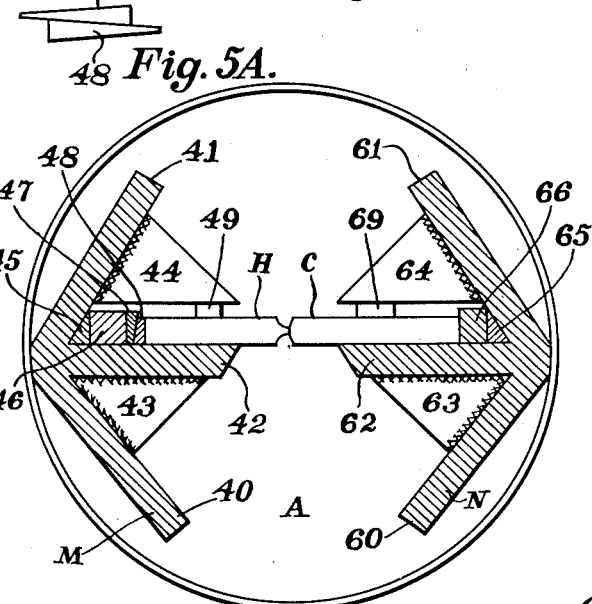
*Fig. 5.*     *Fig. 5A.*
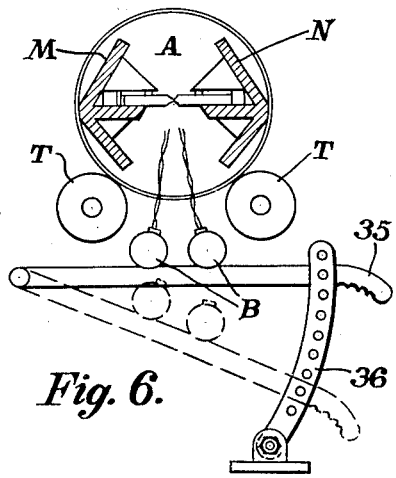
*Fig. 6.*
INVENTOR.
Harold D. Stuck
BY
Pearson & Pearson
ATTORNEY'S Feb. 24, 1953 H. D. STUCK 2,629,677
PROCESS OF MANUFACTURING COMPOUND CUTTING MACHINE KNIVES
Filed Oct. 11, 1949 2 SHEETS—SHEET 2

INVENTOR.
Harold D. Stuck
BY
Pearson & Pearson
ATTORNEYS

Patented Feb. 24, 1953

2,629,677

UNITED STATES PATENT OFFICE 2,629,677

PROCESS OF MANUFACTURING COMPOUND CUTTING MACHINE KNIVES

Harold D. Stuck, Andover, Mass., assignor to John W. Bolton & Sons, Inc., Lawrence, Mass., a corporation of Massachusetts Application October 11, 1949, Serial No. 120,632

3 Claims. (Cl. 148—12.4)

This invention relates to a method of manufacturing compound metal knives, especially for cutting paper, boxboard and felt, of the machine type, which may be of various lengths, widths and thickness, comprising a cutting part to have a cutting edge and which may be of various types of high speed steels. The knives described herein are typical, running from fifty inches to two hundred twenty-five inches in length, four inches to nine inches in width, and five-sixteenths inch to one inch in thickness. Knives of this character are subjected to great lateral pressure when passing through a stack of paper and must keep a perfectly straight alignment and a perfect cutting edge at the end of a bevel and this edge must frequently be sharpened if flaws develop or defects occur in the edge. The cutting part may be made of various grades of high speed steel and while the processes of this application can be used on many of them, it is especially useful on the species known as high speed tool steel, usually having a content of molybdenum and tungsten. The edge of a long, heavy, flat hard steel bar has not been successfully butt welded to the corresponding edge of a similar soft steel bar with a weld sufficiently strong to resist lateral pressure because of the formation of cracks and defects which develop in and near the weld of such machine knives of the character described.

With this type of knife, for reasons of economy and service, it is necessary to have holes for fastening with bolts and/or screws, to be drilled and tapped through the "back" part near the opposite edge portion from the cutting edge. For convenience I will call this the "holding part" of the knife, while the other part which is to be kept sharpened and comes in contact with the material to be cut, I will call the "cutting part" of the knife.

The cutting part, which, as it is sharpened gradually becomes narrower until worn out, here described as the "cutting part," is made of a high grade, long wearing high speed type tool steel made by the best processes. The "holding part" is made of soft steel which will be machinable after the whole knife is hardened and tempered, ready for use. The metal in most common use is soft steel of approximately .015% carbon.

The purpose is to unite these two dissimilar steels together along one edge of each, to form a solid, integral, compound, one piece member, which will be of sufficient strength to withstand the stress of severe service, as well as permit the necessary heat treating the high speed tool steel cutting portion, to meet the critical problems of cutting whatever paper material is desired by the user.

I accomplish this by the use of a suitable welding material melted on between and with the contacting edges by electric arc welding, either alternating or direct cementing, under accurate control, accomplished in such a way that the welding metal becomes a connecting alloy which in a finished knife merges gradually from the hard cutting member to the soft holding member. Also in doing this, there is no brittle zone, or cracking of the very sensitive high speed tool steel during the various heating and cooling cycles, or machining operations. Up to this time, there has been no known dependable method of joining these two metals in any manner which would resist these stresses and stay in one piece, free from flaws.

The welding material in a certain way, is locally cast at high temperature between the prepared edges of the two members making up the knife, namely the hard steel part (H. S.) and the soft steel part.

The welding material commonly called 25–20 Stainless Steel (Type 310) is, after being deposited, in a cast condition and blended with the adjoining edges of the cutting and holding parts. In this state it has a purely dendritic structure (commonly called Pine-Tree) which is weaker and more brittle than a structure which has been reduced by heat and pressure, thereby breaking up the directional tendencies of cooling molten metal. Reduction by hot rolling in the vicinity of 2000° F. has satisfactorily proved to have broken up this undesired structure and greatly increased the strength, ductility, density and uniformity of the union of these two members. The length is about double in this operation.

I prefer to use a tungsten containing steel of the high speed type for the cutting member, a metal which will make a satisfactory weld, and a holding member material of a good grade of soft steel, which will be machinable after proper heat treatment of the cutting portion, which requires the heating and cooling of the entire blade.

The specific product which we produce is a compound machine knife in which a flat bar of a hard tool steel alloy of the tungsten and molybdenum type and of substantially the dimensions and character stated is butt welded or edge welded to a flat bar of soft steel by a ferrous welding material, the three alloys being substantially of the following formulae.

A preferred formula for the cutting member of high speed tool steel is:

| | Percent |
|---|---|
| Carbon | .80– 1.25 |
| Manganese | .20– .50 |
| Silicon | .20– .50 |
| Chromium | 4.00–12.00 |
| Molybdenum | 3.00– 6.00 |
| Tungsten | .50–18.00 |
| Vanadium | .50– 4.00 |
| Balance iron | |

A preferred holding member or backing is:

| | Percent |
|---|---|
| Carbon | 0.–.25 |
| Manganese | 0.–.50 |
| Silicon | 0.–.30 |
| Balance iron | |

A preferred formula for the welding material (rod or wire) is:

| | Percent |
|---|---|
| Carbon | below .10 |
| Chromium | 17.00–28.00 |
| Nickel | 7.00–22.00 |
| Silicon | maximum .50 |
| Columbium | 0.– .20 |
| Balance iron | |

The drawings are all substantially diagrammatic to illustrate the process, although the jig itself is shown in several views.

Fig. 1 is an end elevation of a flat hard steel bar and a flat soft steel bar, each with a preferred form of contacting edges, showing how these edges are pressed together.

Fig. 2 is a diagrammatic end view of the preferred arrangement of these bars after their double bevelled edges have been forced together and preferably both bars straightened as in such a jig as shown in Figs. 5, 6 and 8, with three weldings made by three processes or passes indicated and showing what is substantially the result of the welding on the top side. The words "passes" and "pass" have their usual meaning which is "lengthwise."

Fig. 3 is a diagrammatic end view showing the welds made by two passes after the assembly shown in Fig. 2 has been turned so that the top is at the bottom after the welds or passes are made on the bottom side also.

Fig. 4 is an end view of the compound machine knife with the hard steel and the soft steel bars welded together after the welding, heating, rolling and other steps in the process to make a complete knife ready for sharpening. This view indicates that the width remains substantially the same while the thickness is reduced by the rolling.

Fig. 5 is a cross sectional view as on the line 5—5 of the jig shown in Fig. 8.

Fig. 5A is a diagrammatic view of what might be called the two lengthwise wedges indicated by 47 and 48 of Fig. 5.

Fig. 6 is a view similar to Fig. 5, but also includes the mechanism for raising and lowering the heating elements.

Figure 7:
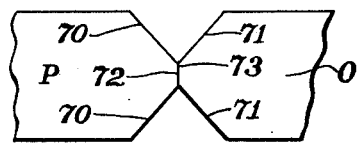
Fig. 7 is an end view similar to Fig. 1 showing a modification of the tenon edges of a hard steel bar and a soft steel bar.

Taking a typical case, I select a high speed tool steel bar C of perhaps 6′ in length, 3″ in width and 1″ in thickness as shown in Fig. 1, along one edge, which is to adjoin the soft steel, I preferably form an edge 10 of a modified V-shape. Preferably the part 11 is flat to fit the flat part 13 of the edge 12 of the holding part H. On the soft steel member H, the edge to adjoin to the tool steel is fromed on its face as in Fig. 1 with a center projecting rib preferably with a flat part 13.

The projecting edge 12 is of the general shape of a tenon with preferably a concave top face 20 and bottom face 21. I will refer to it generally as a "tenon edge." The hard steel edge 10 is of a double bevel form with a top bevel 22 and a bottom bevel face 24 and I will refer to this as a "double bevel edge."

Figure 8:
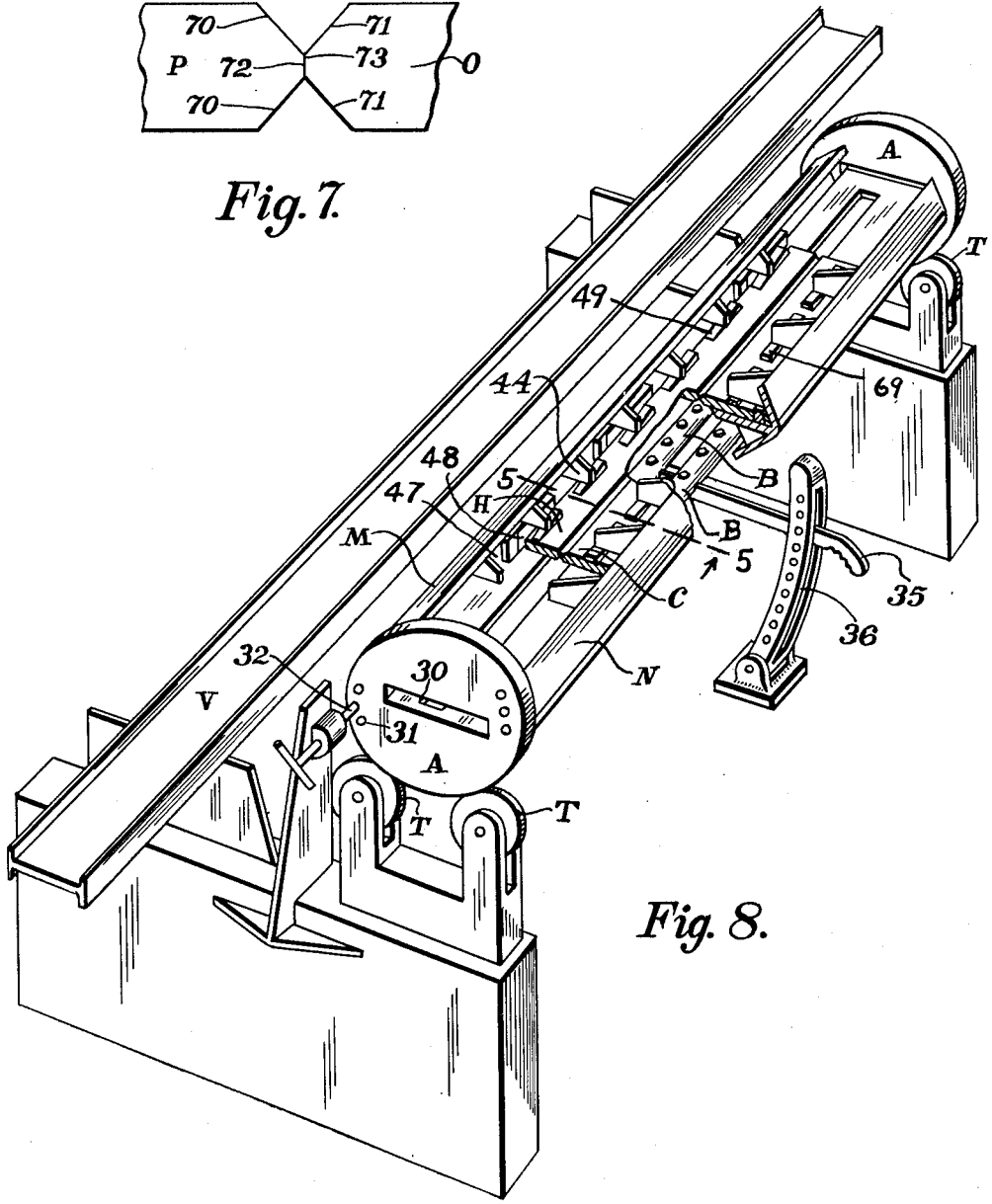
Fig. 8 is a perspective view of a preferred type of jig for carrying out my process.

These are placed together in a suitable fixture or jig shown in Figs. 5, 6, 8, which can be turned on its longitudinal axis and is provided with accurate means to hold each bar firmly at its top, bottom and back so that the two members, at their engaging edges, can be aligned, in both lengthwise and transverse planes.

Preferred devices are shown in the drawings.

The whole holding means and both members of the intended knife are now rotated on trunion T, T to a transverse angle of about 15°, with the hard steel C as the lower member. The two pieces held at such proper angle and in tight contact, are then preheated to about 800° F. to 1100° F. after which the first weld, which I will call a holding weld, (1) is run in the root of the channel formed between 20 and 22. This is made by the electric welding method. I find it more convenient to make this weld with a flux in granulated form spread in the channel or trough formed between the upper parts 20 and 22 of faces 10 and 12.

I prefer to use a flux of the composition such as 90% calcium silicite and 10% chromium oxide (green) or other suitable analysis. As this flux melts, during welding, it must be scraped or ground off clean after each weld, to prepare the metals for the next weld.

The welding material is used as an electrode and is constantly melting and merging as each pass is made. The welding temperature should be such that the material of the electrode is liquid and it is delivered in an ovoidal stream as indicated in the drawings, and this temperature is such as to melt and liquify the adjoining interfaces of the hard steel and of the soft steel so that parts fuse, blend, merge and mix to form a variable alloy between the edges of the hard and soft steel bars.

I find it convenient to make the first weld by hand to be sure the union between the bars is perfect. This weld may be made by hand with a flux covered welding rod 50 as an electrode in a well known manner.

The other welds may be made by hand or by an electrode carrier running on a track such as V.

After this first holding or closing weld is made, I then make a second weld (2) which is the crux or key weld. This should dilute or melt the proper amount of high speed tool steel at the top or surface 22 and blend it with the welding material and should also have the proper contour at this point so that subsequent welds do not disturb or react upon the interface now established between the welding metal and the high speed steel, thus avoiding ruptures and cracks later in the process. On this side of the knife, a third weld (3) (or in some cases more) additional passes or welds are made.

This weld or these welds melt part of the top face 20 of the edge of the holding member and also part of the first and second welds and also goes through tenon face 12 and the nose or point 11 of the V face 10, melting and blending the parts 13 and 11, which adjoin each other, the whole forming with the stainless steel welding material a blend or an alloy composed of the three materials. The part near the holding member is more like the metal of that member and the part near the cutting member is more like the material of the cutting member. I will call this joining part of the compound knife a variable alloy or weld.

The fixture or jig is now inverted or turned over to bring the channel or trough now at the bottom to the top side to receive and blend its edges with the welding material at the desired angle, preferably with the hard steel as the lower member below horizontal at an angle between 10 degrees and 25 degrees (all the time being kept at a temperature over 800° F.).

When the partly completed compound bar is turned over, there is left on the other side, more or less, of the original edge faces 10 and 12 while the part near the original contacting faces 13 and 11 is blended with the welding material, much of the top edge of the rib of the holding part being already melted and blended and a substantial part of the top edge of the cutting part being melted and blended.

Another pass is now made with the same type of stainless steel welding material with the result shown graphically at 4 in Fig. 3. This pass is made with a considerably higher current flow in order to accomplish both the penetration necessary to reach and weld into high speed steel as on the side first welded, thereby making a complete joining of the weld metal through the entire thickness of the knife. Still another pass is made in the same way, thus producing as nearly as could be ascertained the blending, melting or welding indicated by 5.

Where the top and bottom welds come together, there is a particular merging of the three materials, while at the top and bottom composed principally of the stainless steel welding material, there is a bead such as indicated by 56 and 57 in Fig. 3. This series of welding makes a complete joining of the welding material and the hard and soft steel through the entire thickness of the compound knife.

The last weld passing is preferably made nearer the holding part than the cutting part while the first, second, and fourth passes are made nearer the cutting part.

While the now complete compound knife blank is still hot (800° F. to 1100° F.) it is transferred and preheated to about 1200° F. and so held for about one hour, and it is then before cooking below 800° F. put in an annealing furnace at 1600° F. where it is slowly cooled. This relieves all welding stresses.

After cleaning all surfaces and inspecting and found satisfactory, the compound bar is slowly heated to between 2075° F. and 2125° F., preferably to 2100° F. and hot rolled to a rough half inch thickness, which further improves the weld, as previously described. While still hot between 1200° F. and 1400° F., it is again annealed by heating to between 1575° F. and 1625° F., preferably to 1600° F. and slowly cooled to prevent cracking on cooling, and also to allow proper straightening edgewise and flatwise, as well as putting a predetermined camber in the length so that when hardened, it will be flat and straight.

This hardening preferably is done rapidly by heating to 2100° F. to 2300° F. and then quickly cooling, preferably in the air to about 1000° F.

The hot rolling extends the compound bar to about twice its original length but its width is only slightly increased.

Tempering after hardening requires several heatings to from 900° F. to 1200° F. preferably from 1050° F. to 1150° F. to obtain the desired hardness and toughness of edge, taking into consideration the type of cutting being done, material cut, and angle of bevel necessary and preferably cooling in air. Multiple tempering will toughen the compound bar and put the cutting portion as well as the weld zone in a stable condition, so that it will remain the same until completely worn out by the user.

In some cases, all of the welds may be made by an electrode of soft steel wire such as known as "Armco" which is composed of 99.5% (Fe) iron, .30% silicon, .10% manganese, and .10% carbon.

As shown in the drawings, bars or members C and H are flat with edges 10 and 12, and about half the desired finished length after hot rolling.

The cutting member which becomes a cutting part and is made of high speed or hard, tool steel is represented by C with an edge 19 formed as with a double bevel 22, 24 with a flat portion at 11. The holding member which becomes a holding part H is made of a relatively soft steel, as indicated, and has a tenon-shaped edge 12, which might be described as a curved tenon as the top 20 is curved and the bottom at 21 is curved, while the flat part 13 between them is shown as engaging the flat part 11 of the cutting member C.

Members H and C are placed in a jig such, for instance, as shown in Figs. 5 and 8, straightened flatwise as by wedges 49 and 69 and then edgewise are straightened and their flat edge faces 11 and 13 are forced into close contact as by wedges 47 and 48. Preferably the jig with the two members C and H is turned to slope in a plane of from 10 to 25 degrees laterally of a horizontal plane and they are held there with the cutting member C down.

The welding material W comes from and forms an electrode for welding which for convenience is shown in Figs. 2 and 3, as 50. In the first pass 1, the limit of the welding material after welding is shown in dotted lines at 51 and as entering into the faces 20 and 22 and also practically merging with and destroying the flat faces 11 and 13. The limit of the second pass 2 is indicated by 52 and its material merges with that of the first pass 51 and also with more of the material of the face 22 of member C while the material of the third pass 3, as shown, merges to the limit indicated by 53 with both 1 and 2, as well as the face 20 and blends with the material near the contacting faces 11 and 13, in the manner indicated.

After these three passes are made, as shown in Fig. 3, the members C and H preferably in a jig, one type of which is shown in Figs. 5, 6, and 8, are so turned that what was the top is now at the bottom with the trough shown in Fig. 2 at the top to receive more of the welding material as follows:

The fourth pass 4, the limits of which are indicated by 54 merges into the face 24 and thereupon the fifth pass 5 is made, the material of which, the limits of which are indicated by 55, still further merges with the material of pass 4 and with that of the original welds 1, 2, and 3, and it also cuts into the face 21, as shown at 55. After the third weld, a bead 56 was formed on what was the top face and after the fifth weld, there is another bead 57 on what was originally the bottom face.

As a convenient way of handling the welding process, I show a jig, Figs. 5, 6, and 8, which is composed of two angle iron members M and N carried between the turning disks A and A resting on trunnions T, T, one disk A having a slot 30 through which the two members or bars C and H can be passed and preferably one or both disks are provided with holes 31 into which a suitable pin 32 can be passed to hold them at an angle with a horizontal plane of between ten and twenty-five degrees.

B, B represent heating means which preferably are gas burners which can be lifted up to the full line position as shown in Fig. 6, or dropped to the dotted line position, as by a lifting lever 35 adjustable on a quadrant such as 36 to allow the jig to be turned.

Projecting from the middle of the angle iron M, formed of two members 40 and 41, is a middle platform 42 and projecting from the angle iron member N made up of members 60 and 61 is a platform 62.

A convenient arrangement is to have a permanent backing 45 on M and 65 on N with a shim 66, the part N being provided with fixed bottom angle braces 63 and the other or top part 61 with triangular downwardly projecting members 64. There are corresponding parts 43, 44 on the part M with a shim such as shown at 46 on that side corresponding with 66 on the other side.

To straighten the bars H and C flatwise or vertically, I find a convenient form of wedges are such as 49 on M and 69 on N and to force the two contacting edges 11 and 13 together, I find it convenient to use the double wedges such as shown at 47 and 48, Fig. 5 and Fig. 5A, back of the member H to force it towards member C and to make as perfect a contact between 11 and 13 as is possible.

After the welding is completed, the process described in the preamble hereof is carried out so that the finished compound bar is as shown in Fig. 4, roughly one-half the thickness of the members H and C when starting but only a very little wider.

As shown in Fig. 7, the edges of the hard steel bar O and soft steel bar P can both be of a double bevel type as shown at 70, 70, and 71, 71, respectively, each preferably with a flat contacting face 72 or 73.

The number of passes may be more or less, increased or diminished but the preferred number is as herein described.

I claim:

1. The process of making a compound flat cutting machine knife having a soft steel backing portion with the formula:

| | Percent |
|---|---|
| Carbon | 0.–.25 |
| Manganese | 0.–.50 |
| Silicon | 0.–.30 |
| Balance iron | | and a hard steel cutting portion with the formula:

| | Percent |
|---|---|
| Carbon | .80– 1.25 |
| Manganese | .20– .50 |
| Silicon | .20– .50 |
| Chromium | 4.00–12.00 |
| Molybdenum | 3.00– 6.00 |
| Tungsten | .50–18.00 |
| Vanadium | .50– 4.00 |
| Balance iron | | which comprises; double beveling one longitudinal edge of a bar of soft steel and a corresponding edge of a bar of hard steel, clamping said bars together with said edges in engagement, preheating said bars to a temperature between 800° and 1100° F., electric arc welding the edges of said bars together by depositing molten metal from a low carbon steel electrode in the grooves formed by the beveled edges using a plurality of passes of said electrode along each groove, and prior to cooling below the preheating temperature, annealing by further heating to 1600° F. and slow cooling, thereafter reheating the annealed bar to a temperature between 2075° and 2125° F. and hot rolling to elongate the bar and materially decrease its thickness, reannealing the hot rolled bar and then heat treating to harden and temper the cutting portion thereof.

2. The process of making a compound flat cutting machine knife having a soft steel backing portion with the formula:

| | Percent |
|---|---|
| Carbon | 0.–.25 |
| Manganese | 0.–.50 |
| Silicon | 0.–.30 |
| Balance iron | | and a hard steel cutting portion with the formula:

| | Percent |
|---|---|
| Carbon | .80– 1.25 |
| Manganese | .20– .50 |
| Silicon | .20– .50 |
| Chromium | 4.00–12.00 |
| Molybdenum | 3.00– 6.00 |
| Tungsten | .50–18.00 |
| Vanadium | .50– 4.00 |
| Balance iron | | which comprises; double beveling one longitudinal edge of a bar of soft steel and a corresponding edge of a bar of hard steel, clamping said bars together with said edges in engagement, preheating said bars to a temperature between 800° to 1100° F., electric arc welding the edges of said bars together by depositing molten metal from a steel electrode having the formula:

| | Percent |
|---|---|
| Carbon | below .10 |
| Chromium | 17.00–28.00 |
| Nickel | 7.00–22.00 |
| Silicon | maximum .50 |
| Columbium | 0.– .20 |
| Balance iron | | in the grooves formed by the beveled edges using a plurality of passes of said electrode along each groove, and prior to cooling below the preheating temperature, annealing by further heating to 1600° F. and slow cooling, thereafter reheating the annealed bar to a temperature between 2075° and 2125° F. and hot rolling to elongate the bar and materially decrease its thickness, reannealing the hot rolled bar and then heat treating to harden and temper the cutting portion thereof.

3. A compound metal cutting knife made of hard steel and soft steel bars united at their edges by the process described in claim 1.

HAROLD D. STUCK.

REFERENCES CITED

The following references are of record in the file of this patent:

UNITED STATES PATENTS

| Number | Name | Date |
|---|---|---|
| 1,020,158 | Powers | Mar. 13, 1912 |
| 1,535,096 | Blum | Apr. 28, 1925 |
| 1,538,028 | Davis | May 19, 1925 |
| 1,885,679 | Brooks | Nov. 1, 1932 |
| 2,340,796 | Chyle | Feb. 1, 1944 |
| 2,434,321 | Kleimer et al. | Jan. 13, 1948 |

OTHER REFERENCES

"Metals Handbook," pp. 664, 665, 1948 edition.